United States Patent [19]

Boettner

[11] 4,365,987
[45] * Dec. 28, 1982

[54] APPARATUS AND METHOD OF CONDITIONING AND CONVEYING THERMOPLASTIC MATERIAL

[75] Inventor: George B. Boettner, Corning, N.Y.

[73] Assignee: Corning Glass Works, Corning, N.Y.

[*] Notice: The portion of the term of this patent subsequent to Oct. 5, 1999, has been disclaimed.

[21] Appl. No.: 317,993

[22] Filed: Nov. 4, 1981

[51] Int. Cl.³ .............................................. C03B 5/23
[52] U.S. Cl. ...................................... 65/137; 65/126; 65/135; 65/326; 65/356
[58] Field of Search .................. 65/126, 128, 135, 136, 65/137, 326, 327, 348, 356, 134

[56] References Cited

U.S. PATENT DOCUMENTS

| | | |
|---|---|---|
| 1,663,093 | 3/1928 | Peiler .................................. 65/330 X |
| 2,038,627 | 4/1936 | Badger ................................: 65/135 X |
| 2,282,554 | 5/1942 | Barker, Jr. ............................ 65/128 |
| 2,993,079 | 7/1961 | Augsburger . |
| 3,268,321 | 8/1966 | Chapman ........................... 65/128 X |
| 3,519,412 | 7/1970 | Olink ..................................... 65/346 |
| 3,524,206 | 8/1970 | Boettner et al. . |
| 3,583,861 | 6/1971 | Preston . |
| 3,725,558 | 4/1973 | t'Serstevens . |
| 3,742,111 | 6/1973 | Pieper . |
| 3,942,968 | 3/1976 | Pieper . |
| 4,029,887 | 6/1977 | Spremulli . |
| 4,143,232 | 3/1979 | Bansal-Spremulli . |

*Primary Examiner*—Arthur D. Kellogg
*Attorney, Agent, or Firm*—John P. DeLuca

[57] ABSTRACT

A glass delivery system is disclosed having a glass conducting pipe enclosed within a refractory structure. The refractory structure is spaced about the pipe and defines a closed space for receiving therein a quantity of the glass. Flow control means is provided for regulating flow through the pipe. Means is further provided for isolating the flow control device from glass in the closed space to thereby avoid a bypass of said flow control device. A method for operating a glass delivery system is also disclosed.

35 Claims, 1 Drawing Figure

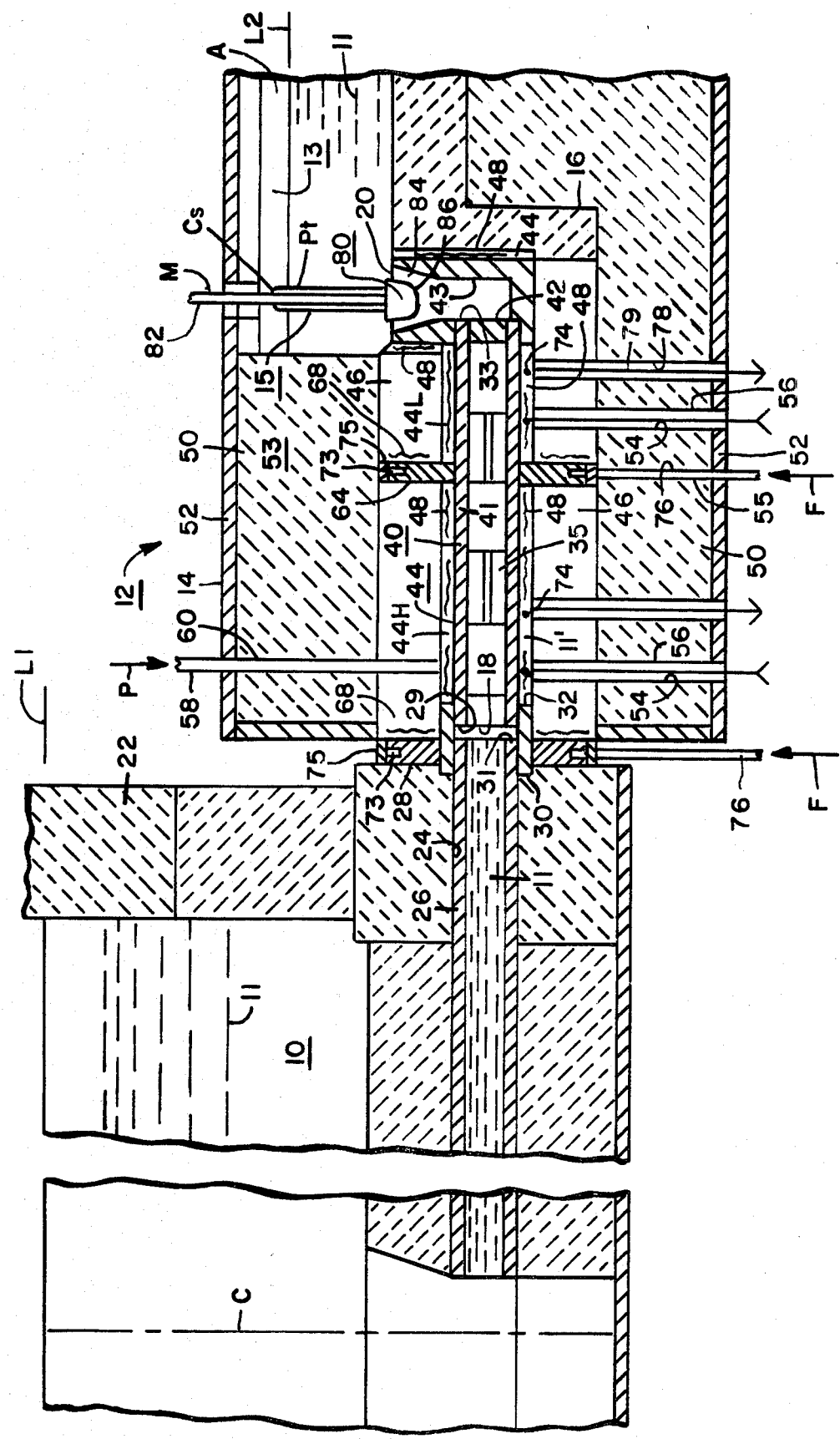

APPARATUS AND METHOD OF CONDITIONING AND CONVEYING THERMOPLASTIC MATERIAL

BACKGROUND OF THE INVENTION

The present invention relates to an apparatus for conditioning and conveying molten thermoplastic material produced in a melting furnace. The apparatus receives the thermoplastic material from the furnace and discharges the same at some desired temperature and consistency for forming a product. The invention more particularly pertains to a glass delivery system and flow control device wherein the glass is conveyed through a conduit and is simultaneously conditioned to a desired relatively uniform temperature and viscosity as it passes therethrough. The conduit may be immersed in or surrounded by stagnant glass. Heaters, adapted to operate in molten glass located about the conduit, provide uniform heat input into the glass within the conduit and prevent localized hot spots. The conduit may be coupled to a forehearth for further conditioning, and to downstream glass forming equipment via a glass corrosion resistant flow control device.

Vertically oriented electric glass melting furnaces have been known in the prior art for some time, but it has been only in the last several years that such furnaces have been brought to large scale commercial application. In more recently developed furnaces, such as the type illustrated in U.S. Pat. Nos. 2,993,079, 3,524,206, 3,583,861, 3,725,558, 3,742,111, 3,942,968, 4,029,887 and 4,143,232, glass forming batch materials are fed to the upper end of a vertical chamber and refined molten glass is withdrawn from the bottom of the chamber. High quality glass is thus produced in a single vertical chamber, with melting occurring in an upper portion thereof and preferably some refining occurring at the bottom portion.

The molten glass withdrawn from the electric furnace is usually received within a laterally extending connected channel situated at one side of the furnace bottom and thereafter directed through a vertical passageway or riser to a mixing chamber and/or a forehearth. In some glass melting systems there is a differential between the glass level in the furnace and the glass level in the forehearth resulting in a measurable hydrostatic head (sometimes hereinafter referred to as pressure or head). Normally, a flow control device or needle located between the furnace and forehearth controls the flow or volume of glass into the forehearth so as to regulate the head.

In a conventional flow control system, glass under hydrostatic pressure may ultimately work its way through the refractory joints and bypass the flow control device, with flow control being thereby rendered inoperative. A premature and expensive furnace repair is thus required.

Hydrostatic head may be reduced by changing the difference between glass level in the furnace and forehearth. Alternatively, the head may be dissipated by lengthening the connected channel of the delivery system. Each respective alternative lowers the tendency of the glass to bypass the needle. However, neither alternative is particularly desirable because hydrostatic head is a useful driving force for the glass, and a long connected channel is expensive to build and operate.

The present invention of an improved glass delivery system and flow control device has permitted the continued use of a relatively high hydrostatic head as a driving force for the glass. At the same time, an increase in the length of the delivery system to reduce head at the flow control device is not required.

It is well known in the glass melting and forming art that forehearths require substantial amounts of heat energy in order to condition the glass received from the furnace. Thus, the forehearth is a net consumer of energy and the anomalous condition exists wherein a large amount of heat energy is required to "cool" the glass to the proper forming temperatures. The present invention allows for the use of a smaller and lower energy consuming forehearth.

It is also known that molybdenum metal (moly), a preferred glass contact material used herein, has significantly higher wear resistance to moving molten glass than conventional refractory materials. However, it is also well known that moly tends to oxidize at temperatures in excess of 550°-600° C., and thus, the moly must be protected from deleterious atmosphere (oxygen) when it is used at or above these elevated temperatures. The present invention uses moly extensively and provides for its protection.

The present invention performs the functions of transportation, cooling, homogenizing and flow control of molten glass, wherein the useful life of the delivery system is significantly increased and glass-refractory corrosion products, producing glass inhomogeneities and inclusions, are virtually eliminated. Further, the system greatly reduces the net energy required to condition the glass while maintaining a relatively stable hydrostatic driving force for the glass through the system.

In a series of related U.S. patent applications, Ser. Nos. 244,024, 244,022, 244,001, 243,811 filed Mar. 16, 1981 and assigned to the assignee herein, various arrangements of glass melting and transport systems are disclosed in detail. It should be understood that although significant differences exist with such disclosures and the present invention, to the extent necessary, the teachings of said applications are to be considered incorporated herein by reference.

SUMMARY OF THE INVENTION

Apparatus is disclosed for conducting relatively hot molten thermoplastic material from a furnace and delivering the material at a desired homogeneity to a remote location. The apparatus includes a conduit means having an inlet adapted to receive the material at one end from the furnace and an outlet for delivering same to the remote location. A flow control device in flow communication with the outlet of the conduit means regulates the flow of the thermoplastic material from the furnace at a controlled rate and head. A refractory structure located in spaced relation about the conduit means and flow control device defines a space thereabout for the introduction of thermoplastic material. Means is provided for blocking or preventing flow communication between the furnace and the flow control device exterior of the conduit means thereby preventing flow of thermoplastic material in bypassing relation with the flow control device. The conduit means, flow control device and blocking means are preferably fabricated of an oxidizable refractory metal and are maintained immersed in thermoplastic material when exposed to temperatures above an oxidation temperature thereof.

A method is described including confining the material to a flow path having an inlet and outlet, surrounding the flow path with a chamber, communicating the chamber with a supply of the thermoplastic material and blocking flow communication of the material exterior of the flow path between the inlet and the outlet end thereof.

DESCRIPTION OF THE DRAWING

The drawing is a fragmented schematic longitudinal cross sectional elevation of a preferred embodiment of the apparatus of the present invention.

DESCRIPTION OF THE PREFERRED EMBODIMENTS

The drawing shows one embodiment of an apparatus 12 of the present invention (sometimes hereinafter referred to as delivery system 12) for carrying molten thermoplastic material such as glass 11 from a furnace 10 for delivery to a forehearth 13. The delivery system 12 includes a horizontal channel 14, a connected vertical riser 16, and respective inlet and outlet ends 18 and 20. The inlet 18 is preferably coupled to furnace 10 and the outlet 20 is preferably adapted to be coupled to forehearth 13 or other downstream connecting channels and the like. A needle or flow control device 15 may be located at the outlet 20 to control the flow of thermoplastic material or glass 11 from the furnace 10 through the delivery system 12 into the forehearth 13.

Furnace 10 includes an upstanding sidewall portion 22 having a through opening 24 therein. An outlet pipe 26, which may extend to the center C of the furnace 10, is located within said opening 24. Sleeve 30 may be fitted over an outlet end 31 of outlet pipe 26. A first flange 28, peripherally attached about said sleeve 30, seals the opening 24 exterior of the furnace 10. An outlet end 32 of the sleeve 30 extends beyond the first flange 28 for sleevable connection to the delivery system 12. The arrangement is similar to that shown in U.S. patent application Ser. No. 244,022 noted above.

The outlet pipe 26, sleeve 30 and first flange 28 are preferably manufactured of materials which are highly corrosion resistant. While, in the present invention, a refractory metal such as moly is preferred, other materials such as tungsten, tantalum, rhenium, columbium, steel or alloys thereof may be used. Also noble metals, such as platinum, and rhodium or alloys thereof may be used where appropriate.

In one preferred embodiment of the present invention, the delivery system 12 includes an internal conduit, pipe means or flow path 40 which comprises a horizontal cylindrical pipe 41 and vertical cylindrical well 43 having opening 42 therein. Cylindrical pipe 41 has an inboard end 29 slidably and loosely fitted into sleeve 30 of outlet pipe 26, and an outboard end 33 secured in opening 42 of well 43 (e.g., by threading or force fitting). Mixer elements 35 are located axially of pipe 41 to shear the glass 11 for thermally and physically homogenizing it as it passes through conduit 40. A refractory brick structure 46 surrounds conduit 40 in a spaced relation thereby providing an annular chamber or space 44 about the conduit 40 (i.e., pipe 41 and well 43). The refractory brick structure 46 may be manufactured of a glass contact material such as Corhart UNICOR I. A layer of insulation 50 surrounds the refractory brick structure 46. An outer shell or housing 52 covers the insulation 50 and defines an interior chamber 53. Electrically powered heaters 48 may be located in space 44. Water cooled electric power connectors 56 are coupled to the heaters 48 and pass through openings or passageways 54 in insulation 50, shell 52 and refractory brick structure 46.

A second flange 64 is secured to and located about the pipe 41 near the outboard end 33. The second flange 64 extends across the annular chamber 44 and into the refractory structure 46 thereby splitting or segmenting the chamber 44 into respective relatively high and low pressure sections or sides 44H and 44L, the purpose of which will be explained hereinafter.

As mentioned previously, pipe 41 and well 43 are preferably manufactured from a highly corrosion resistant refractory metal such as molybdenum. Although other materials may be used, it has been found that molybdenum is more easily or cheaply fabricated than other refractory metals and is highly resistant to the effects of flowing thermoplastic material such as glass. Because moly oxidizes at above 550° C., and glass 11 entering the delivery system 12 may be at temperatures exceeding 2100° C., means is provided for protecting moly from oxidation. The interior of the conduit 40 is protected from oxidation by the presence of the glass 11 from the furnace 12. Exterior of the conduit 40, the space 44 may be prefilled with a mixture of glass cullet 11'. When melted, the cullet 11' forms a layer of protective material about conduit 40. The high pressure side 44H of chamber 44 may also receive molten glass 11 from the furnace 10 via the relatively loosely fitting connection of sleeve 30 and the inlet 18 of conduit 40. The low pressure side 44L of chamber 44 surrounding a portion of pipe 41 and well 43 is in communication with the forehearth 13. Glass 11 in the forehearth 13 can enter the lower pressure side 44L of chamber 44 about pipe 41 and well 43 near the outlet end 20 of the conduit. The glass and cullet 11', surrounding the conduit 40 in chamber 44, tends to stagnate and remain trapped therewithin, thus preventing possible refractory contamination from entering the conduit 40 and being used to make product.

The conduit 40 expands and contracts due to thermal cycling of the system. Such dimensional change may, if not accommodated, produce undue stress on the system components and cause a failure. The sleeve 30 coupling outlet pipe 26 and pipe 41 of conduit 40 accommodates some of the expansion and contraction of the respective components. Also, the conduit 40 may be made relatively short so that, in the temperature ranges contemplated, the maximum swings in dimensions do not exceed the tolerances of the system.

It should be understood that other arrangements for connecting the furnace 10 and delivery system are possible besides the sleeve 30 between outlet pipe 28 and conduit 40. However, for purposes of repair and the like, the arrangement herein described is preferred because of the relative ease with which a break or separation may be made between the aforementioned components.

A plurality of the heaters 48 may be located immersed in the cullet 11' within the annular chamber 44 to provide proximate heating thereto and thereby control the temperature of glass 11 within said conduit 40. The heaters 48 may be commercially available mesh, rod, plate and ribbon devices. A variety of suitable materials are available for manufacture of the heaters 48 including moly, tungsten and platinum. In addition to providing heat input to the glass 11 within conduit 40, the heaters 48 are used for initially melting the cullet 11' within the chamber 44. The heaters 48 may also serve a dual purpose and be used as electrodes for joule effect heating of the glass 11 by changing the power supplied thereto. Although connections are not shown, conduit 40 may be electrified to act as a heater.

The insulation layer 50 may be selectively varied in thickness and type in order to provide a heat regulating function depending upon the glass composition and operating characteristics of the system 12.

Flange heaters 68 may be located adjacent the respective first and second flanges 28 and 64 to provide some supplemental heat for start up. Although flange heaters 68 are normally shut down subsequent to startup, they could be used for glass temperature control if needed. The flange heaters 68 may be coupled to a source of electricity via means similar to connectors 56 (not shown).

Cooling notches 73, formed in each respective first and second flange 28 and 64, are sealed by peripheral end plates 75. Cooling notches 73 may be coupled to an external source of cooling fluid F (inert gas or liquid) via appropriate plumbing 76. Appropriate openings 55 in housing 52, insulation 50 and refractory structure 46 may be provided as necessary for plumbing 76. Glass 11 and cullet 11′, proximate the respective first and second flanges 28 and 64 and closely adjacent structures, becomes frozen or at least highly viscous and thus creates a glass tight seal to prevent glass leakage thereby. Also, since it is preferred that respective first and second flanges 28 and 64 are fabricated from moly, the cooling provided by cooling fluid F circulated through cooling notches 73 reduces the temperature of the flanges 28 and 64 below the oxidation temperature of the moly.

A purge line 58 passing through an opening 60 in the housing 52, insulation 50 and refractory structure 46 provides an inlet for purge gas P into the space 44. The purge gas P may also be allowed to infiltrate to the chamber 53. The reason for the introduction of purge gas P is that, before startup, oxygen contaminants will undoubtedly be trapped within the housing 52. If, as preferred, moly is used to fabricate the conduit 40, flanges 28 and 64 and heaters 48 and 68, oxygen should be thoroughly purged to avoid risk of destroying the oxidizable components. After startup when the glass 11′ in the space 44 melts, the purge P is no longer required.

One or more thermocouples 74 may be located at various points along conduit 40 in openings or passageways 78 in housing 52, insulation 50 and refractory 46. The thermocouples 74 provide output signals over connecting wires 79 indicative of the temperature of the conduit 40 and the glass 11 contained therein. Each of the heaters 48 may be separately controlled to regulate the heat input into the system all along conduit 40 in response to outputs of thermocouples 74. Thus, temperature gradients in the glass 11 may be moderated and localized hot spots may be prevented.

Flow control and pressure regulation of the glass 11 is provided by flow control device or needle 80 and well 43. The needle 80 may be vertically reciprocally supported from above by rod 82. Well 43 has a contoured inner flow surface 84 and needle 80 has a correspondingly shaped working surface 86 in variable spaced relation therein. The needle 80 and well 43 cooperate to restrict the flow of glass 11 into the forehearth 13 and to relieve or dissipate hydrostatic pressure of the glass 11. The rod 82 carrying the needle 80 may be controlled by conventional means not shown.

In the furnace 10, the glass 11 has a selected operating level $L_1$. In the forehearth 13, the glass is maintained at a second lower level $L_2$. The position of the needle 80 relative to the well 43 is regulated to establish the forehearth glass level $L_2$ against the hydrostatic head provided by the high glass level $L_1$ of the furnace. The difference in glass levels ($L_2-L_1$) or head may be a number of feet (typically 2-5).

In order to reduce costs, the length of the conduit 40 from inlet 18 to outlet 20 should be relatively short (i.e., 6 feet). A short flow path does not greatly reduce the effects of head. Therefore, it is preferable to provide a conduit 40 with a reduced diameter in order to introduce flow resistance into the system and thereby dissipate the head. The diameter of the conduit is preferably about five inches (5″).

The sizing of the conduit 40 and positioning of the needle 80 within well 43 provides sufficient effective head reduction to adequately control the glass level $L_2$ in the forehearth 13. The present invention, therefore, allows the use of available glass head to move glass 11, and at the same time reduces cost and system size by means of a conduit 40 with a reduced flow radius.

Hydrostatic pressure in the high pressure side 44H of chamber 44 upstream of second flange 64 is relatively higher than the pressure downstream thereof in low pressure side 44L. This is because the high pressure side 44H is in communication with the glass 11 in the furnace 10 at upper level $L_1$. The low pressure side 44L is in communication with glass 11 in the forehearth 13 which is at the lower level $L_2$. The second flange 64 effectively separates or isolates the pressure differential. Thus, glass 11 in the furnace 10 cannot enter the low pressure side 44L of the chamber 44 and bypass well 43 and needle 80. Further, since the conduit 40 is primarily fabricated from corrosion resistant materials and virtually glass tight, none of the glass 11 in the furnace 10 and conduit 40 can work its way past the well 43. Such a condition would result in a failure of the flow control and cause defects in the glass from refractory inclusions resulting from structural wear. The moly conduit 40 has containment strength and high corrosion resistance thereby reducing system repair and maintenance requirements.

Normally, the atmosphere A above the glass level $L_2$ in the forehearth 13 is at an elevated temperature. Consequently, the control rod 82 must be protected. The control rod 82 may be formed of composites (shown schematically) including an inner moly rod M for strength and a ceramic sleeve Cs thereabout which, in turn, has an exterior platinum shield Pt thereabout. The ceramic Cs protects the moly M from the heat, and the platinum Pt, in contact with glass 11, protects the ceramic Cr from glass corrosion especially near the glass level $L_2$.

The flow control provided by needle 80 and well 43 makes hydrostatic head available for moving the glass 11. The use of conduit 40 to carry the glass 11 provides a system which is virtually leak proof thereby rendering the flow control reliable. The conduit 40 is impervious to contamination by corrosion or outgassing of the refractory structure 46 thereby enhancing glass quality, since refractory contamination produces cord and inclusions in the glass. Further, volatilization of the glass composition is inhibited by the use of the conduit 40.

While there has been described what at present are considered to be the preferred embodiments of the present invention, it will be apparent to those skilled in the art that various changes and modifications may be made therein without departing from the invention and it is intended in the appended claims to cover all such changes and modifications as fall within the true spirit and scope of the invention.

I claim:

1. Apparatus for conducting relatively hot molten thermoplastic material from a furnace and delivering the thermoplastic material to a remote location with a desired homogeneity comprising: conduit means having an inlet end adapted to receive the thermoplastic material from the furnace and an outlet end for delivering said thermoplastic material from the furnace to the remote location; flow control means in communication with said conduit means for regulating the flow of the thermoplastic material from the furnace; a refractory structure located about said conduit means defines a chamber which surrounds the same and extends between said inlet and outlet ends of the conduit means, said chamber being in flow communication with at least one of the furnace and the remote location, said chamber being filled with a supply of thermoplastic material immersing the conduit means therein; and means located in the chamber intermediate the respective inlet and outlet ends of the conduit means for blocking flow communication of the thermoplastic material exterior of the conduit means through said chamber between the furnace and the remote location.

2. Apparatus as defined in claim 1 including heater means located in the chamber for supplying heat thereto and the conduit means.

3. Apparatus as defined in claim 1 including means for protecting surfaces of the conduit means from deleterious ambience including purge means for supplying said chamber with a purge fluid relatively inert with respect to the refractory structure and the conduit means.

4. Apparatus as defined in claim 1 wherein the means for blocking flow communication of the thermoplastic material exterior of the conduit means between the furnace and the remote location comprises:
at least one flange supportively coupled about the conduit means; said flange extending radially outwardly thereof in communication with the structure for segmenting the chamber into separate portions.

5. Apparatus as defined in claim 4 including flange cooling means located in thermal communication with at least a circumferential portion of said second flange.

6. Apparatus as defined in claim 4 wherein the thermoplastic material exerts a hydrostatic pressure differential between the inlet and outlet of the conduit means for driving the thermoplastic material in a direction from relatively higher to relatively lower hydrostatic pressure, and the flange blocks flow of the thermoplastic material in the chamber from one separate portion to the other.

7. Apparatus as defined in claim 6 wherein the flange includes a cooling passageway in communication with a source of cooling fluid for lowering the temperature of the flange below a selected operating temperature thereof and reducing the temperature of thermoplastic material in the vicinity thereof such that it forms a seal between the flange and the structure.

8. Apparatus as defined in claim 1 including stationary shearing means located within said conduit means for homogenizing the consistency of the thermoplastic material passing therethrough.

9. Apparatus as defined in claim 1 further including a flow control device in said conduit means for regulating flow of thermoplastic material from the furnace.

10. Apparatus as defined in claim 9 wherein the flow control device includes: a well having a flow control surface; a needle having a working surface located in reciprocal spaced relation with said flow control surface; and means for regulating the position of the needle relative to the well for varying the spaced relation therebetween and to thereby regulate the hydrostatic pressure of the thermoplastic material.

11. Apparatus as defined in claim 10 wherein the means for regulating the position of the needle comprises a control rod engaging a portion of the needle in opposition to the working surface thereof for moving said needle reciprocally.

12. Apparatus as defined in claim 11 wherein said needle, well and control rod are fabricated from oxidizable refractory metals selected from the group consisting of molybdenum, tungsten, tantalum, rhenium, columbium, steel and alloys thereof.

13. Apparatus as defined in claim 12 wherein said control rod comprises: an elongate rod adapted to be partially immersed in the thermoplastic and coupled to the needle at a distall end of said rod, said rod extending through an upper surface of the thermoplastic material to be exposed to a relatively hot ambience; said rod further including a refractory sleeve surrounding same at least over a portion thereof near the upper surface of the thermoplastic material for shielding the rod from ambience, and a noble metal shield covering the refractory sleeve for protecting same from corrosion by the thermoplastic material.

14. Apparatus as defined in claim 1 wherein said conduit means is fabricated from a noble metal.

15. Apparatus as defined in claim 1 wherein said conduit means is an oxidizable refractory metal selected from the group consisting of molybdenum, tungsten, tantalum, rhenium, columbium, steel and alloys thereof.

16. Apparatus as defined in claim 1 further comprising: heat insulation means surrounding said structure; and heater means located proximately about the conduit means for providing heat input at selected locations thereabout, said heater means and said heat insulating means functioning in combination to produce means for governing the temperature of the thermoplastic material to the desired thermal homogeneity as it passes through said conduit means.

17. Apparatus as defined in claim 16 wherein the heater means comprises a plurality of heater elements located proximately with said conduit means for providing heat input therein.

18. Apparatus as defined in claim 16 wherein heater means comprises a portion of said conduit means being connected with a source of electrical power.

19. Apparatus as defined in claim 1 including electrode means located in communication with said chamber for providing electrical joule heating energy through said thermoplastic material.

20. Apparatus as defined in claim 1 including expandable means in communication with at least one end of said conduit means being adapted to accommodate relative motion of the conduit means through thermal cycling of the apparatus.

21. Apparatus as defined in claim 20 wherein said expandable means comprises a sleevable connection between said inlet of the conduit means and said furnace.

22. Apparatus as defined in claim 1 including a second flange portion supportively coupled about at least one of the inlet and outlet of said conduit means, said flange extending radially outward thereof in communication with said second structure.

23. Apparatus as defined in claim 1 wherein the heat insulating means is selectively arranged about the structure for differentially regulating heat energy along said conduit means.

24. Apparatus as defined in claim 1 wherein the conduit means comprises a pipe having a sized diameter adapted to impede flow of the thermoplastic material therethrough at a selected rate.

25. Apparatus as defined in claim 1 further including means for introducing a purge fluid into said chamber.

26. Apparatus as defined in claim 1 further including means for detecting the temperature in the vicinity of the conduit.

27. Apparatus as defined in claim 1 further including means for accommodating thermal expansion of the conduit.

28. A method of conveying a supply of molten thermoplastic material from a source at one temperature and pressure to a remote location at another temperature and pressure, said thermoplastic material existing at virtually any fluid condition comprising the steps of: confining the material to a selected flow path; conducting the material along the flow path from an inlet end at the source to an outlet end thereof at the remote location; surrounding the flow path with a concentric annular chamber exterior thereof, said chamber having wall portions in spaced relation with said flow path, said wall portions defining a space within said chamber; communicating a portion of the molten thermoplastic material from the supply of the same to the exterior of the flow path into the space; surrounding the flow path with the thermoplastic material communicated thereto for immersing the flow path in said material within said space; and blocking flow communication of said thermoplastic material located exterior of the flow path from the inlet end to the outlet end thereof which flow communication would occur due to the difference in pressure between the supply and the remote location.

29. A method as defined in claim 28 including the step of introducing a gaseous substance into said chamber proximate said flow path for protecting same from deleterious ambience.

30. A method as defined in claim 28 including the step of introducing said hot thermoplastic material at the flow path inlet at a relatively nonuniform temperature distribution and wherein the temperature of the material introduced is relatively hot up to about 2100° C.

31. A method as defined in claim 28 including the step of accommodating thermal expansion of the flow path relative to inlet and outlet ends thereof.

32. A method as defined in claim 28 including the step of shearing said material along said flow path.

33. A method as defined in claim 28 wherein the step of heating the material includes at least one of the steps of supplementing heat carried by said material and heating the material to a molten state from a cold solid condition.

34. A method as defined in claim 28 including the step of selectively insulating the flow path for regulating the rate of heat dissipation therealong.

35. A method as defined in claim 28 further including the step of regulating the flow of thermoplastic material in the flow path from the inlet end to the outlet end thereof.

* * * * *